United States Patent
Zha

(10) Patent No.: US 12,174,477 B2
(45) Date of Patent: Dec. 24, 2024

(54) TOUCH DISPLAY PANEL WITH TOUCH ELECTRODE MULTIPLEXED AS COMMON ELECTRODE

(71) Applicant: TCL China Star Optoelectronics Technology Co., Ltd., Shenzhen (CN)

(72) Inventor: Bao Zha, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/610,495

(22) PCT Filed: Sep. 17, 2021

(86) PCT No.: PCT/CN2021/118920
§ 371 (c)(1),
(2) Date: Nov. 11, 2021

(87) PCT Pub. No.: WO2023/039814
PCT Pub. Date: Mar. 23, 2023

(65) Prior Publication Data
US 2024/0248340 A1    Jul. 25, 2024

(30) Foreign Application Priority Data
Sep. 14, 2021  (CN) .......................... 202111073771.X

(51) Int. Cl.
*G02F 1/1333*  (2006.01)
*G02F 1/1343*  (2006.01)
(Continued)

(52) U.S. Cl.
CPC .... *G02F 1/13338* (2013.01); *G02F 1/134309* (2013.01); *G02F 1/1368* (2013.01);
(Continued)

(58) Field of Classification Search
None
See application file for complete search history.

(56) References Cited

U.S. PATENT DOCUMENTS

2016/0187694 A1*  6/2016  Kim ...................... G02F 1/1362
                                                                 349/12
2017/0060289 A1*  3/2017  Shin ........................ G09G 3/20
(Continued)

FOREIGN PATENT DOCUMENTS

CN          106200168 A        12/2016
CN          111443511 A         7/2020
(Continued)

OTHER PUBLICATIONS

International Search Report in International application No. PCT/CN2021/118920,mailed on Jun. 10, 2022.
(Continued)

*Primary Examiner* — Ryan Crockett
(74) *Attorney, Agent, or Firm* — Nathan & Associates; Menachem Nathan

(57) ABSTRACT

The present application discloses a touch display panel including a first substrate, a liquid crystal, and a second substrate, wherein the first substrate is located on a light-exiting side of the touch display panel. The first substrate includes a first underlayer, a touch structure layer, a thin film transistor layer, and a pixel electrode layer. The touch structure layer and the thin film transistor layer are disposed on a side of the first underlayer close to the liquid crystal, and the pixel electrode layer is disposed on the thin film transistor layer. The touch structure layer includes a touch electrode, which is multiplexed as a common electrode.

20 Claims, 5 Drawing Sheets

(51) Int. Cl.
*G02F 1/1368* (2006.01)
*G06F 3/041* (2006.01)
*G06F 3/044* (2006.01)

(52) U.S. Cl.
CPC ........ *G06F 3/0412* (2013.01); *G06F 3/04164* (2019.05); *G06F 3/0443* (2019.05); *G06F 3/0418* (2013.01)

(56) References Cited

U.S. PATENT DOCUMENTS

| | | | |
|---|---|---|---|
| 2017/0147110 A1 | 5/2017 | Xu | |
| 2017/0322650 A1 | 11/2017 | Liu | |
| 2018/0188581 A1* | 7/2018 | Peng | ................... G02F 1/13394 |
| 2020/0110479 A1 | 4/2020 | Liu | |
| 2020/0348784 A1* | 11/2020 | Wu | ..................... G06F 3/04164 |
| 2021/0358977 A1* | 11/2021 | Zhang | ................. H01L 27/1225 |
| 2022/0206327 A1* | 6/2022 | Gong | ................. G06F 3/04184 |

FOREIGN PATENT DOCUMENTS

| CN | 213023844 U | 4/2021 |
|---|---|---|
| JP | 2016126334 A | 7/2016 |

OTHER PUBLICATIONS

Written Opinion of the International Search Authority in International application No. PCT/CN2021/118920, mailed on Jun. 10, 2022.

Japanese Office Action issued in corresponding Japanese Patent Application No. 特願2021-560660 dated Jan. 29, 2024, pp. 1-3.

* cited by examiner

TOUCH DISPLAY PANEL WITH TOUCH ELECTRODE MULTIPLEXED AS COMMON ELECTRODE

TECHNICAL FIELD

The application relates to a technical field of display technology, in particular to a touch display panel.

BACKGROUND

At present, touch sensors and small-size display devices, such as mobile phones, all adopt touch functions. Touch technology has developed from On-glass to On-cell until current In-cell mode. Development of integrating the touch functions into a large-screen display tends to be slow. At present, On-glass method is commonly adopted. In-cell has a low module thickness and a high signal-to-noise ratio, but this touch method is mainly concentrated in an IPS/FFS liquid crystal display mode.

During a research and practice process of prior art, inventors of the present application have found that a VA display mode of a liquid crystal display panel has an effect of shielding a touch, especially a capacitive touch, because it has an entire-surface common electrode on a color film side, thereby reducing the touch effect.

Technical Problems

The present embodiment provides a touch display panel, which improves a touch effect of a liquid crystal display panel.

SUMMARY

An embodiment of the present application further provides a touch display panel, including:
  a first substrate located on a light-exiting side of the touch display panel;
  a second substrate disposed opposite to the first substrate, and located on a light-entering side of the touch display panel; and
  a liquid crystal disposed between the first substrate and the second substrate;
  wherein the first substrate includes a first underlayer, a touch structure layer, a thin film transistor layer, and a pixel electrode layer, the touch structure layer and the thin film transistor layer are disposed on a side of the first underlayer close to the liquid crystal, the pixel electrode layer is disposed on a side of the thin film transistor layer and the touch structure layer close to the liquid crystal;
  the touch structure layer includes a touch electrode and a touch trace, the touch trace is disposed in a different layer from the touch electrode, the touch trace is connected to the touch electrode, the touch electrode is multiplexed as a common electrode; and
  the touch display panel further includes a display touch chip connected to the touch trace.

Optionally, in some embodiments of the present application, the touch structure layer is prepared in the thin film transistor layer.

Optionally, in some embodiments of the present application, the thin film transistor layer is disposed on a side of the touch structure layer away from the first underlayer.

Optionally, in some embodiments of the present application, the thin film transistor layer includes a first metal layer, a first insulating layer, an active layer, a second metal layer, and a second insulating layer, the first insulating layer is disposed on the first metal layer, the active layer is disposed on the first insulating layer, the second metal layer is disposed on the first insulating layer, the second insulating layer covers the active layer and the second metal layer, the pixel electrode layer is disposed on the second insulating layer; and
  the first metal layer includes a gate electrode and a touch electrode, the second metal layer includes a source electrode, a drain electrode, and a touch trace, the source electrode and the drain electrode are connected to the active layer, and the touch trace is disposed on the first insulating layer and spaced from the active layer.

Optionally, in some embodiments of the present application, the pixel electrode layer includes a pixel electrode, and the touch electrode and the pixel electrode are partially overlapped.

Optionally, in some embodiments of the present application, an orthographic projection of a portion of the touch electrode on a plane where the first underlayer is located is complementary to an orthographic projection of a portion of the pixel electrode on the plane where the first underlayer is located.

Optionally, in some embodiments of the present application, the touch electrode includes a first frame, a first trunk electrode, and a first branch electrode, the first trunk electrode is connected in the first frame, an end of the first branch electrode is connected to the first trunk electrode, another end of the first branch electrode is connected to the first frame, a plurality of first branch electrodes are arranged at intervals;
  the pixel electrode includes a second frame, a second trunk electrode, and a second branch electrode, the second trunk electrode is connected in the second frame, an end of the second branch electrode is connected to the second trunk electrode, another end of the second branch electrode is connected to the second frame, and a plurality of second branch electrodes are arranged at intervals; and
  wherein the first frame and the second frame are disposed overlappingly, the first trunk electrode and the second trunk electrode are disposed overlappingly, and an orthographic projection of the first branch electrode on the plane where the first underlayer is located and an orthographic projection of the second branch electrode on the plane where the first underlayer is located are disposed alternately.

Optionally, in some embodiments of the present application, the touch structure layer further includes a first insulating layer and a second insulating layer, the touch electrode, the first insulating layer, the touch trace, and the second insulating layer are sequentially disposed on the first underlayer;
  the thin film transistor layer includes a first metal layer, a third insulating layer, an active layer, a second metal layer, and a fourth insulating layer, wherein the third insulating layer is disposed on the first metal layer, the active layer is disposed on the third insulating layer, the second metal layer is disposed on the third insulating layer, the fourth insulating layer covers the active layer and the second metal layer, and the pixel electrode layer is disposed on the fourth insulating layer;
  the first metal layer includes a gate electrode, the second metal layer includes a source electrode and a drain electrode, wherein the source electrode and the drain electrode are connected to the active layer, and the pixel electrode is connected to the drain electrode.

An embodiment of the present application further provides a touch display panel, including:

a first substrate located on a light-exiting side of the touch display panel;

a second substrate disposed opposite to the first substrate, and located on a light-entering side of the touch display panel; and a liquid crystal disposed between the first substrate and the second substrate;

wherein the first substrate includes a first underlayer, a touch structure layer, a thin film transistor layer, and a pixel electrode layer, the touch structure layer and the thin film transistor layer are disposed on a side of the first underlayer close to the liquid crystal, and the pixel electrode layer is disposed on a side of the thin film transistor layer and the touch structure layer close to the liquid crystal.

Optionally, in some embodiments of the present application, the touch structure layer includes a touch electrode and a touch trace, the touch trace is disposed in a different layer from the touch electrode, the touch trace is connected to the touch electrode, and the touch electrode is multiplexed as a common electrode.

Optionally, in some embodiments of the present application, the touch structure layer is prepared in the thin film transistor layer.

Optionally, in some embodiments of the present application, the thin film transistor layer is disposed on a side of the touch structure layer away from the first underlayer.

Optionally, in some embodiments of the present application, the thin film transistor layer includes a first metal layer, a first insulating layer, an active layer, a second metal layer, and a second insulating layer, the first insulating layer is disposed on the first metal layer, the active layer is disposed on the first insulating layer, the second metal layer is disposed on the first insulating layer, the second insulating layer covers the active layer and the second metal layer, the pixel electrode layer is disposed on the second insulating layer; and the first metal layer includes a gate electrode and a touch electrode, the second metal layer includes a source electrode, a drain electrode, and a touch trace, the source electrode and the drain electrode are connected to the active layer, and the touch trace is disposed on the first insulating layer and spaced from the active layer.

Optionally, in some embodiments of the present application, the pixel electrode layer includes a pixel electrode, and the touch electrode and the pixel electrode are partially overlapped.

Optionally, in some embodiments of the present application, an orthographic projection of a portion of the touch electrode on a plane where the first underlayer is located is complementary to an orthographic projection of a portion of the pixel electrode on the plane where the first underlayer is located.

Optionally, in some embodiments of the present application, the touch electrode includes a first frame, a first trunk electrode, and a first branch electrode, the first trunk electrode is connected in the first frame, an end of the first branch electrode is connected to the first trunk electrode, another end of the first branch electrode is connected to the first frame, a plurality of first branch electrodes are arranged at intervals;

the pixel electrode includes a second frame, a second trunk electrode, and a second branch electrode, the second trunk electrode is connected in the second frame, an end of the second branch electrode is connected to the second trunk electrode, another end of the second branch electrode is connected to the second frame, and a plurality of second branch electrodes are arranged at intervals; and wherein the first frame and the second frame are disposed overlappingly, the first trunk electrode and the second trunk electrode are disposed overlappingly, and an orthographic projection of the first branch electrode on the plane where the first underlayer is located and an orthographic projection of the second branch electrode on the plane where the first underlayer is located are disposed alternately.

Optionally, in some embodiments of the present application, the touch structure layer further includes a first insulating layer and a second insulating layer, the touch electrode, the first insulating layer, the touch trace, and the second insulating layer are sequentially disposed on the first underlayer;

the thin film transistor layer includes a first metal layer, a third insulating layer, an active layer, a second metal layer, and a fourth insulating layer, wherein the third insulating layer is disposed on the first metal layer, the active layer is disposed on the third insulating layer, the second metal layer is disposed on the third insulating layer, the fourth insulating layer covers the active layer and the second metal layer, and the pixel electrode layer is disposed on the fourth insulating layer; and the first metal layer includes a gate electrode, the second metal layer includes a source electrode and a drain electrode, wherein the source electrode and the drain electrode are connected to the active layer, and the pixel electrode is connected to the drain electrode.

Optionally, in some embodiments of the present application, material of the pixel electrode is same as material of the touch electrode.

Optionally, in some embodiments of the present application, the second substrate includes a second underlayer and a common electrode layer disposed on a side of the second underlayer close to the liquid crystal; and the touch display panel further includes a color film layer prepared in the first substrate or the second substrate.

Optionally, in some embodiments of the present application, the touch display panel the further includes a display touch chip connected to the touch trace.

The touch display panel of the embodiment of the present application includes a first substrate, a liquid crystal, and a second substrate, the first substrate is located on a light-exiting side of the touch display panel, and the second substrate is located on a light-entering side of the touch display panel. The first substrate includes a first substrate, a touch structure layer, a thin film transistor layer, and a pixel electrode layer, the touch structure layer and the thin film transistor layer are disposed on a side of the first substrate close to the liquid crystal, the pixel electrode layer is disposed on the thin film transistor layer, and the touch structure layer includes a touch electrode, which is multiplexed as a common electrode.

BENEFICIAL EFFECTS

In a touch display panel of an embodiment of the present application, a first substrate provided with a thin film transistor is disposed on a light-exiting side, and a touch structure layer is prepared in the first substrate. That is, a array substrate prepared with the touch structure is disposed on the light-exiting side, and a counter substrate prepared with a common electrode is disposed on a light-entering side, thereby reducing interference of the common electrode of a second substrate on a touch electrode and further improving the touch effect. Multiplexing the touch electrode into the common electrode has simplified a structure.

BRIEF DESCRIPTION OF THE DRAWINGS

In order to more clearly illustrate the technical solutions in the embodiments of the present application, the accompanying drawings required for use in the embodiments will be briefly described below. It will be apparent that the accompanying drawings in the following description are merely some embodiments of the present application, and other drawings may be obtained from these drawings without creative effort by those skilled in the art.

DETAILED DESCRIPTION OF THE EMBODIMENTS

Figure 1:
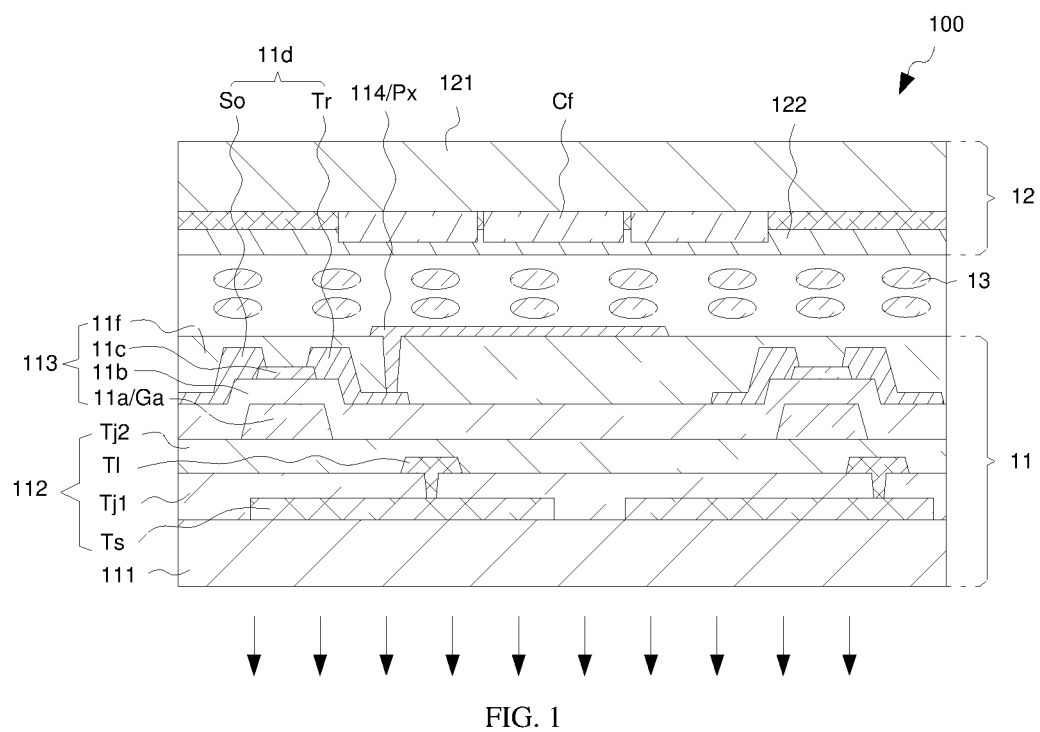
FIG. 1 is a schematic structural diagram of a touch display panel according to a first embodiment of the present application.

The following describes the technical solutions of the embodiments of the present application in a clear and complete manner with reference to the accompanying drawings. It will be apparent that the described embodiments are only a part of the embodiments of the present application, but not all of the embodiments. Based on the embodiments of the present application, all other embodiments obtained by those skilled in the art without creative effort fall within the scope of the present application. Furthermore, it should be understood that the specific embodiments described herein are intended only to illustrate and explain the present application and are not intended to limit the present application. And terms "up" and "down" used in the present application, in the absence of a reverse description, generally refer to an up and low parts of the device in actual use or operation, in particular in the drawing direction. And terms "in" and "out" are for the profile of the device.

An embodiment of the present application provides a touch display panel, which will be described in detail below.

It should be noted that the order of description of the following embodiments is not a limitation on the preferred order of the embodiments.

It should be noted that a thin film transistor layer 113/213 of the embodiment of the present application may include one of a top gate type thin film transistor, a bottom gate type thin film transistor, and a double gate type thin film transistor. The embodiment of the present application takes the bottom gate type thin film transistor as an example for description, but is not limited thereto.

A thin film transistor in the embodiment of the present application may be a P-type thin film transistor or an N-type thin film transistor. In this embodiment of the present application, the P-type thin film transistor is used as an example for description, but is not limited thereto.

Referring to FIG. 1, a first embodiment of the present application provides a touch display panel 100 including a first substrate 11, a second substrate 12, and a liquid crystal 13.

The first substrate 11 is located on a light-exiting side of the touch display panel 100. The second substrate 12 is disposed opposite to the first substrate 11. The second substrate 12 is located on a light-entering side of the touch display panel 100. The liquid crystal 13 is disposed between the first substrate 11 and the second substrate 12.

The first substrate 11 includes a first underlayer 111, a touch structure layer 112, a thin film transistor layer 113, and a pixel electrode layer 114. The touch structure layer 112 and the thin film transistor layer 113 are disposed on a side of the first underlayer 111 close to the liquid crystal 13. The pixel electrode layer 114 is disposed on a side of the thin film transistor layer 113 and the touch structure layer 112 close to the liquid crystal 13.

In the touch display panel 100 of the first embodiment, the first substrate 11 provided with the thin film transistor layer 113 is disposed on the light-exiting side, and the touch structure layer 112 is prepared in the first substrate 11. That is, by integrating the touch structure layer 112 on a side of array substrate and using the array substrate as the light-exiting side, interference of a common electrode layer 122 of the second substrate 12 in a touch electrodes Ts is reduced and a touch effect is improved.

Optionally, the second substrate 12 includes a second underlayer 121, and the common electrode layer 122 disposed on a side of the second underlayer 121 close to the liquid crystal 13.

The touch display panel 100 further includes a color film layer Cf prepared in the first substrate 11 or the second substrate 12.

When the color film layer Cf is prepared in the first substrate 11, the color film layer Cf is disposed between the thin film transistor layer 113 and the pixel electrode layer 114. That is, the touch display panel 100 is a liquid crystal touch display panel of a COA type. When the color film layer Cf is prepared in the second substrate 12, the color film Cf is disposed between the second underlayer 121 and the common electrode layer 122. That is, the touch display panel 100 is a liquid crystal touch display panel of a non-COA type.

The touch display panel 100 of the embodiment of the present application is described by taking the liquid crystal touch display panel of the non-COA type as an example, but is not limited thereto.

Optionally, the materials of the first underlayer 111 and the second underlayer 121 may be one of glass, sapphire, and silicon.

Optionally, the touch structure layer 112 includes a touch electrode Ts and a touch trace T1. The touch trace T1 and the touch electrode Ts are disposed in different layers. The touch trace T1 is connected to the touch electrode Ts. The touch electrode Ts is multiplexed as a common electrode.

Multiplexing the touch electrodes Ts as a common electrode saves process steps and simplifies an internal structure of the touch display panel 100.

Within one frame of time including a display time and a touch time, when the touch display panel 100 is in a display phase, the touch electrode Ts acts as a common electrode, and when the touch display panel 100 is in a touch phase, the touch electrode Ts performs a touch operation.

Figure 2:
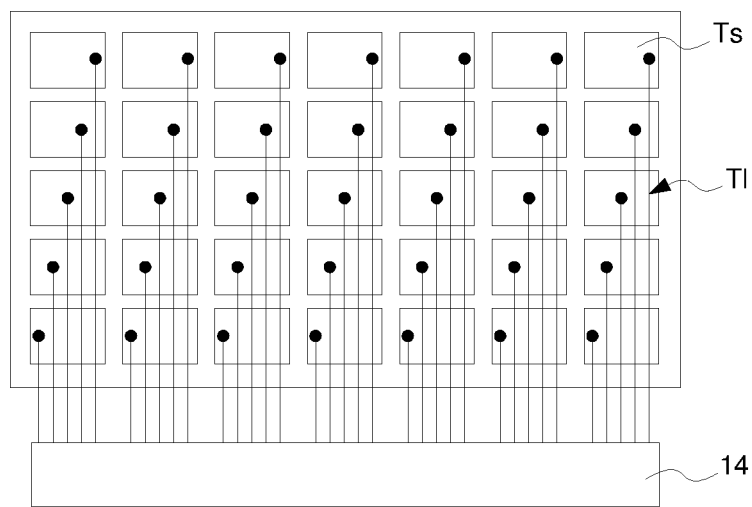
FIG. 2 is a schematic plan structural diagram of the touch display panel according to the first embodiment of the present application.

Optionally, referring to FIG. 2, the touch display panel 100 further includes a display touch chip 14. The display touch chip 14 is connected to the touch trace T1.

Optionally, touch electrodes Ts are arranged in an array. Each of the touch traces T1 is connected to each of the touch electrodes Ts. Each of the touch traces T1 is connected to a pin of the display touch chip 14 correspondingly.

Optionally, the display touch chip may be a TDDI chip.

Optionally, a length of the touch electrode Ts is between 2 mm and 9 mm, such as 2 mm, 3 mm, 4 mm, 5 mm, 6 mm, 7 mm, 8 mm, or 9 mm. A width of the touch electrode Ts is between 2 mm and 9 mm, such as 2 mm, 3 mm, 4 mm, 5 mm, 6 mm, 7 mm, 8 mm, or 9 mm.

Optionally, a thin film transistor layer 113 is disposed on a side of the touch structure layer 112 away from the first underlayer 111.

The touch structure layer 112 of the touch display panel 100 of the present embodiment is independently prepared to facilitate a touch of a large-sized panel. In addition, the touch structure layer 112 is disposed closer to the first underlayer 111 to improve the touch effect.

Optionally, the touch structure layer 112 further includes a first insulating layer Tj1 and a second insulating layer Tj2. The touch electrode Ts, the first insulating layer Tj1, the touch trace T1, and the second insulating layer Tj2 are sequentially stacked on the first underlayer 111.

The thin film transistor layer 113 includes a first metal layer 11a, a third insulating layer 11b, an active layer 11c, a second metal layer 11d, and a fourth insulating layer 11f. The third insulating layer 11b is disposed on the first metal layer 11a. The active layer 11c is disposed on the third insulating layer 11b. The second metal layer 11d is disposed on the third insulating layer 11b. The fourth insulating layer 11f covers the active layer 11c and the second metal layer 11d. The pixel electrode layer 114 is disposed on the fourth insulating layer 11f.

The first metal layer 11a includes a gate electrode Ga. The second metal layer 11d includes a source electrode So and a drain electrode Tr. The source electrode So and the drain electrode Tr are connected to the active layer 11c. The pixel electrode layer 114 includes a pixel electrode Px. The pixel electrode Px is connected to the drain electrode Tr.

Optionally, a material of the active layer 11c may include one of amorphous silicon, polysilicon, and an oxide semiconductor.

Optionally, the pixel electrode layer 114 includes a pixel electrode Px. The touch electrode Ts is partially overlapped with the pixel electrode Px to reduce parasitic capacitance.

Optionally, an orthographic projection of a portion of the touch electrode Ts on a plane where the first underlayer 111 is located is complementary to an orthographic projection of a portion of the pixel electrode Px on the plane of the first underlayer 111 is located.

An orthographic projection of a portion of the touch electrode Ts is complementary to an orthographic projection of a portion of the pixel electrode Px, on one hand, an area where the touch electrode Ts and the pixel electrode Px are overlapped is reduced, and the parasitic capacitance is further reduced, and on another hand, a touch area of the touch electrode Ts is guaranteed, and an touch accuracy of the touch electrode Ts is further guaranteed.

Optionally, a material of the pixel electrode Px is same as a material of the touch electrode Ts. For example, indium tin oxide, zinc tin oxide, or indium gallium zinc oxide may be used.

Optionally, the material of the pixel electrode Px may also be different from that of the touch electrode Ts. For example, the material of the touch electrode Ts is metal, and the material of the pixel electrode Px is metal oxide such as indium tin oxide and the like.

Figure 3:
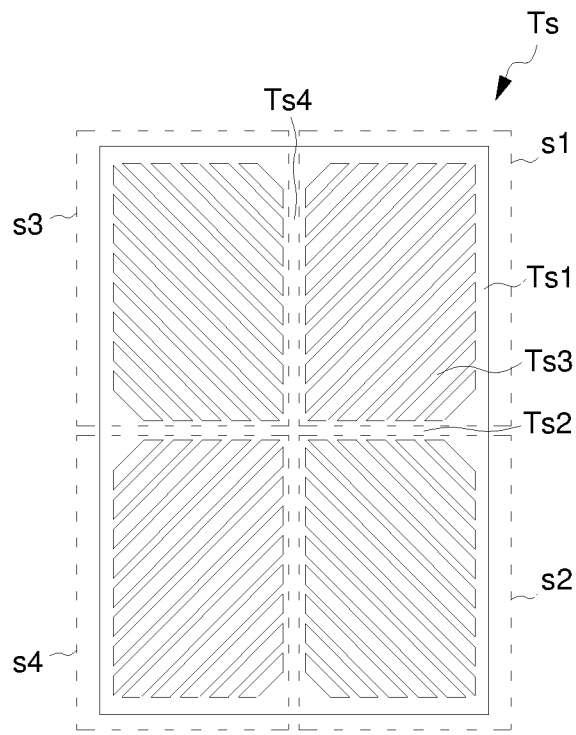
FIG. 3 is a schematic structural diagram of a pixel electrode of the touch display panel according to the first embodiment of the present application.
Figure 4:
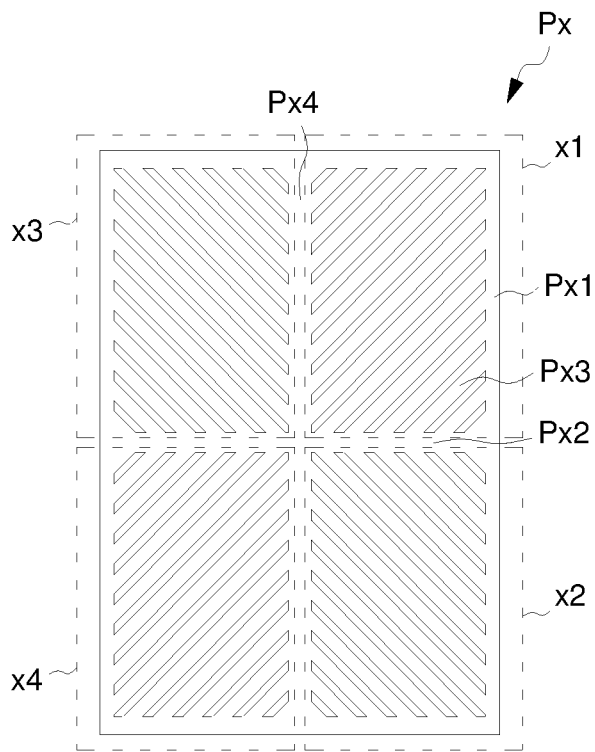
FIG. 4 is a schematic structural diagram of a touch electrode of the touch display panel according to the first embodiment of the present application.

Optionally, referring to FIGS. 3a and 4B, the touch electrode Ts includes a first frame Ts1, a first trunk electrode Ts2, and a first branch electrode Ts3. The first trunk electrode Ts2 is connected to the first frame Ts1. An end of the first branch electrode Ts3 is connected to the first trunk electrode Ts2, and another end of the first branch electrode Ts3 is connected to the first frame Ts1. A plurality of the first branch electrodes Ts3 are arranged at intervals.

Optionally, the touch electrode Ts further includes a third trunk electrode Ts4 disposed in cross-connection with the first trunk electrode Ts2. The first trunk electrode Ts2 and the third trunk electrode Ts4 divide the touch electrode Ts into a first touch region s1, a second touch region s2, a third touch region s3, and a fourth touch region s4. The first branch electrode Ts3 located in the first touch region s1, the first branch electrode Ts3 located in the second touch region s2, the first branch electrode Ts3 located in the third touch region s3, and the first branch electrode Ts3 located in the fourth touch region s4 extend in different directions.

The pixel electrode Px includes a second frame Px1, a second trunk electrode Px2, and a second branch electrode Px3. The second trunk electrode Px2 is connected in the second frame Px1. An end of the second branch electrode Px3 is connected to the second trunk electrode Px2. Another end of the second branch electrode Px3 is connected to the second frame Px1. A plurality of the second branch electrodes Px3 are arranged at intervals.

Optionally, the pixel electrode Px further includes a fourth trunk electrode Px4 disposed in cross-connection with the second trunk electrode Px2. The second trunk electrode Px2 and the fourth trunk electrode Px4 divide the pixel electrode Px into a first pixel region x1, a second pixel region x2, a third pixel region x3, and a fourth pixel region x4. The second branch electrode Px3 located in the first pixel region x1, the second branch electrode Px3 located in the second pixel region x2, the second branch electrode Px3 located in the third pixel region x3, and the second branch electrode Px3 located in the fourth pixel region x4 extend in different directions.

Figure 5:
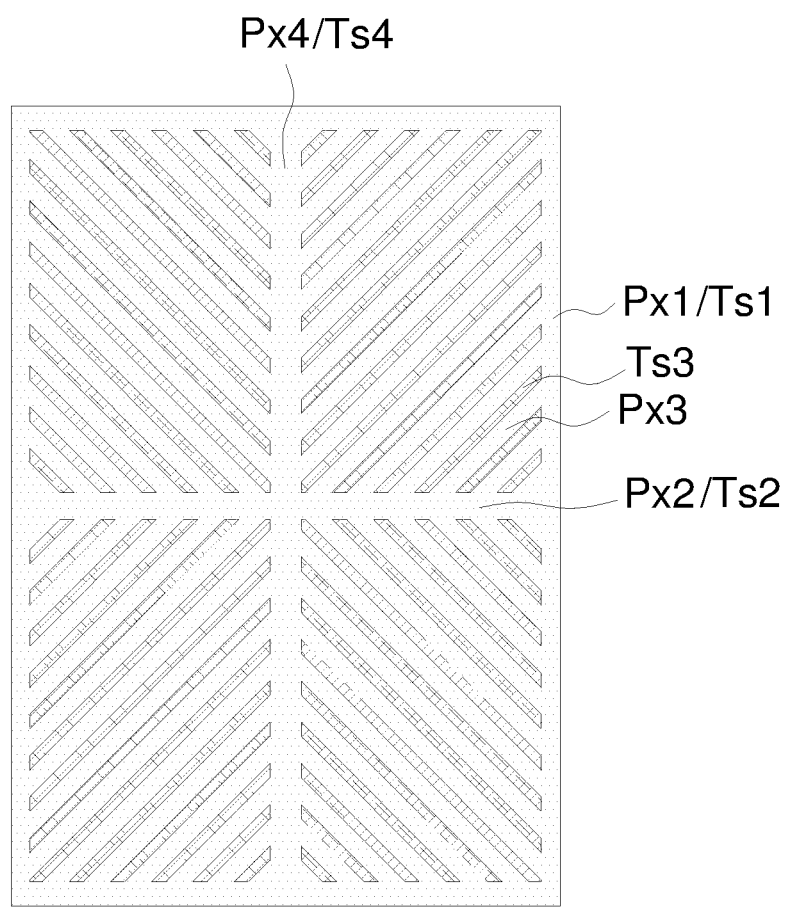
FIG. 5 is a schematic structural diagram of an orthographic projection of the pixel electrode and the touch electrode of the touch display panel according to the first embodiment of the present application.

Referring to FIG. 5, the first frame Ts1 and the second frame Px1 are overlapped. The first trunk electrode Ts2 and the second trunk electrode Px2 are overlapped.

An orthographic projection of the first branch electrode Ts3 on the plane where the first underlayer 111 is located and an orthographic projection of the second branch electrode Px3 on the plane where the first underlayer 111 is located are arranged alternately. That is, the first branch electrode Ts3 and the second branch electrode Px3 are complementarily disposed.

Optionally, the first touch region s1 corresponds to the first pixel region x1, the second touch region s2 corresponds to the second pixel region x2, the third touch region s3 corresponds to the third pixel x3, and the fourth touch region s4 corresponds to the fourth pixel region x4.

In an overlapping region of the first touch region s1 and the first pixel region x1, the first branch electrode Ts3 and the second branch electrode Px3 are alternately and complementarily disposed. Similarly, in the overlapping region of the second touch region s2 and the second pixel region x2, the first branch electrode Ts3 and the second branch electrode Px3 are alternately and complementarily disposed, in an overlapping region of the third touch region s3 and the third pixel region x3, the first branch electrode Ts3 and the second branch electrode Px3 are alternately and complementarily disposed, and in the overlapping region of the fourth touch region s4 and the fourth pixel region x4, the first branch electrode Ts3 and the second branch electrode Px3 are alternately and complementarily disposed.

Optionally, a width of the second branch electrode Px3 is larger than a width of the first branch electrode Ts3. Since the width of the second branch electrode Px3 is larger than the width of the first branch electrode Ts3, a width of a slit between the second branch electrodes Px3 is smaller than a width of a slit between the first branch electrodes Ts3, thereby increasing light transmittance.

In some embodiments, the touch electrode Ts and the pixel electrode Px may also be a two-domain structure, a single domain structure, or the like.

In some embodiments, the touch electrode Ts is also disposed overlappingly with the thin film transistor of the thin film transistor layer 113 to save a space.

Figure 6:
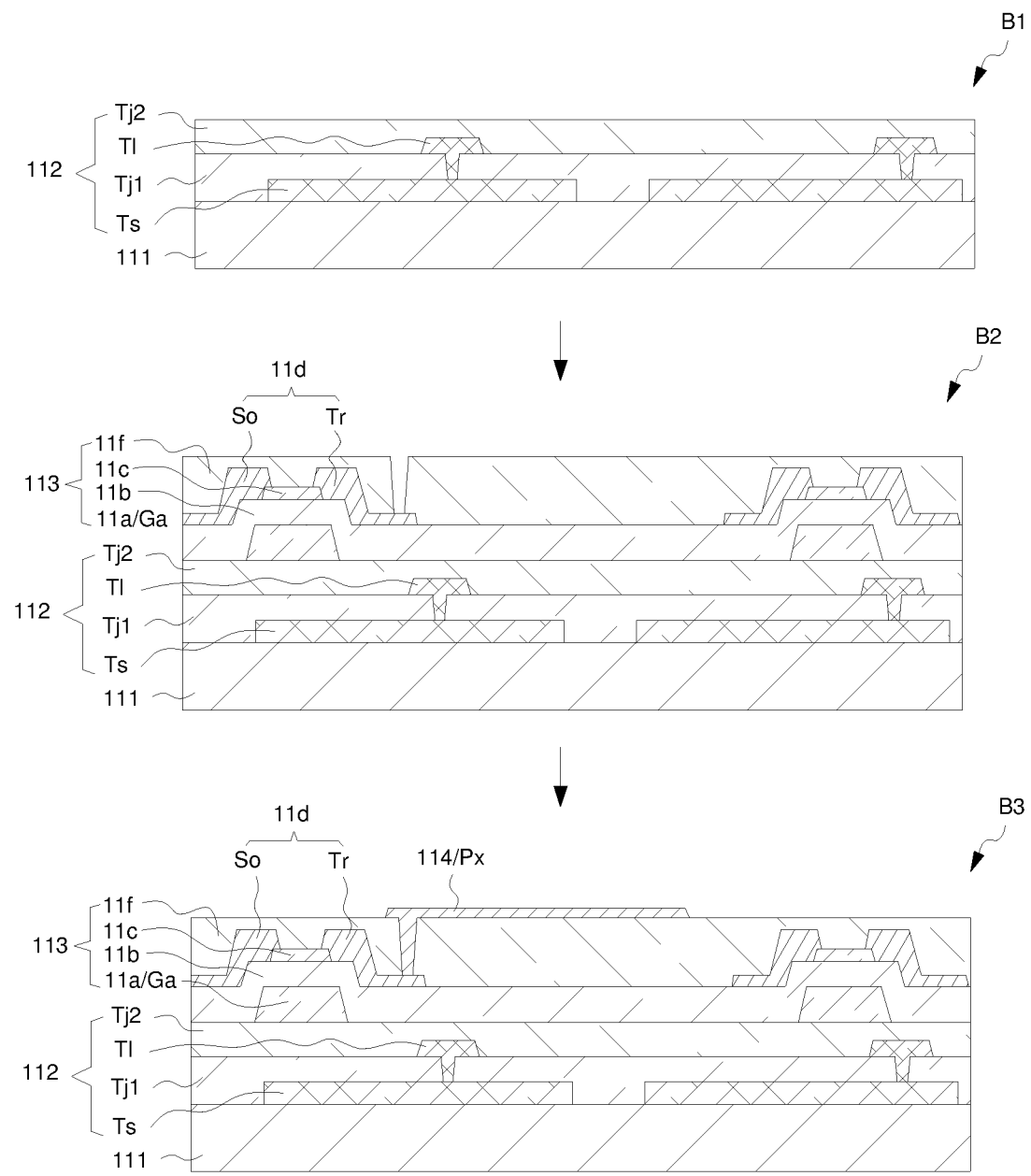
FIG. 6 is a schematic diagram of a preparation process of a first substrate of the touch display panel according to the first embodiment of the present application.

Referring to FIG. 6, a preparation process of the first substrate 11 of the touch display panel 100 according to the first embodiment is as follows:

In step B1, a touch electrode Ts, a first insulating layer Tj1, a touch trace T1, and a second insulating layer Tj2 are sequentially formed on a first underlayer 111 to form a touch structure layer 112. The process then proceeds to step B2.

Optionally, the material of the touch electrode Ts may be an oxide such as indium tin oxide, indium zinc oxide, or the like; or may be metals, alloys, compounds and mixtures thereof with various conductive characteristics such as gold, silver, platinum, or the like.

Optionally, materials of the first insulating layer Tj1 and the second insulating layer Tj2 may include at least one of silicon nitride, silicon oxide, and organic photoresist.

Optionally, a material of the touch trace T1 may be a metal, a metal alloy, or a metal oxide, such as gold, silver, tungsten, copper, molybdenum, iron, aluminum, aluminum-silicon, aluminum-titanium, indium tin oxide, indium zinc oxide, or the like.

In step B2, a first metal layer 11a, a third insulating layer 11b, an active layer 11c, a second metal layer 11d, and a fourth insulating layer 11f are sequentially formed on the touch structure layer 112. The process then proceeds to step B3.

The first metal layer 11a includes a gate electrode Ga. The second metal layer 11d includes a source electrode So and a drain electrode Tr. The source electrode So and the drain electrode Tr are connected to the active layer 11c.

The gate electrode Ga, the source So, the drain Tr, and the active layer 11c are used to form a thin film transistor.

In step B3, a pixel electrode layer 114 is formed on a thin film transistor layer 113. The pixel electrode layer 114 includes a pixel electrode Px. The pixel electrode Px is connected to the drain electrode Tr.

This completes the preparation process of the first substrate 11 of the touch display panel 100 according to the first embodiment of the present application.

Figure 7:
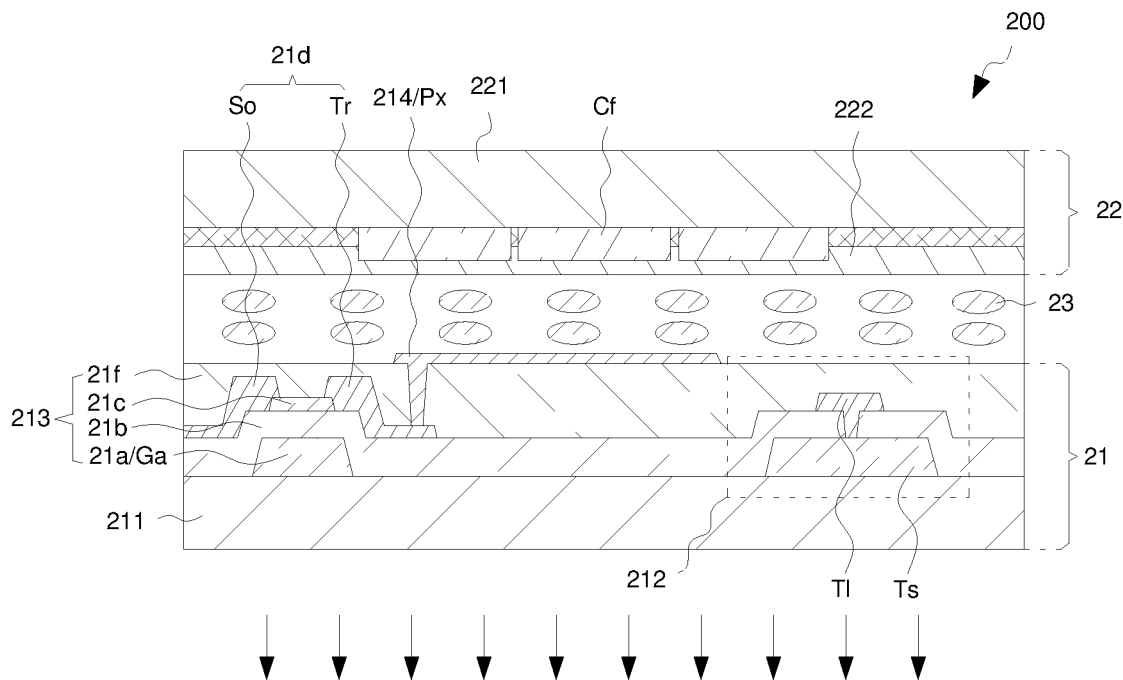
FIG. 7 is a schematic structural diagram of a touch display panel according to a second embodiment of the present application.

Referring to FIG. 7, touch display panel 200 of the second embodiment includes a first substrate 21, a liquid crystal 23, and a second substrate 22. The first substrate 21 is located on a light-exiting side of the touch display panel 200. The second substrate 22 is located on a light-entering side of the touch display panel 200. The first substrate 21 includes a first underlayer 211, a touch structure layer 212, a thin film transistor layer 213, and a pixel electrode layer 214. Both the touch structure layer 212 and the thin film transistor layer 213 are disposed on a side of the first underlayer 211 close to the liquid crystal 23. The pixel electrode layer 214 is disposed on the thin film transistor layer 213. The touch structure layer 212 includes a touch electrode Ts, which is multiplexed as a common electrode.

In the touch display panel 200 of the second embodiment, the first substrate 21 provided with the thin film transistor layer 213 is disposed on the light-exiting side, and the touch structure layer 212 is prepared in the first substrate 21, thereby reducing interference of a common electrode 222 of the second substrate 22 in the touch electrode Ts, and further improving a touch effect.

The touch display panel 200 of the second embodiment is different from the touch display panel 100 of the first embodiment in that: the touch structure layer 212 is prepared in the thin film transistor layer 213 to achieve an effect of saving process steps and reduce a thickness of the touch display panel 200.

Optionally, the thin film transistor layer 213 includes a first metal layer 21a, a first insulating layer 21b, an active layer 21c, a second metal layer 21d, and a second insulating layer 21f. The first insulating layer 21b is disposed on the first metal layer 21a. The active layer 21c is disposed on the first insulating layer 21b. The second metal layer 21a is disposed on the first insulating layer 21b. The second insulating layer 21f covers the active layer 21c and the second metal layer 21a. The pixel electrode layer 214 is disposed on the second insulating layer 21f.

The first metal layer 21a includes a gate electrode Ga and a touch electrode Ts. The second metal layer 21d includes a source electrode So, a drain electrode Tr, and a touch trace T1. The source electrode So and the drain electrode Tr are connected to the active layer 21c. The touch trace T1 is disposed on the first insulating layer 21b and spaced from the active layer 21c.

Figure 8:
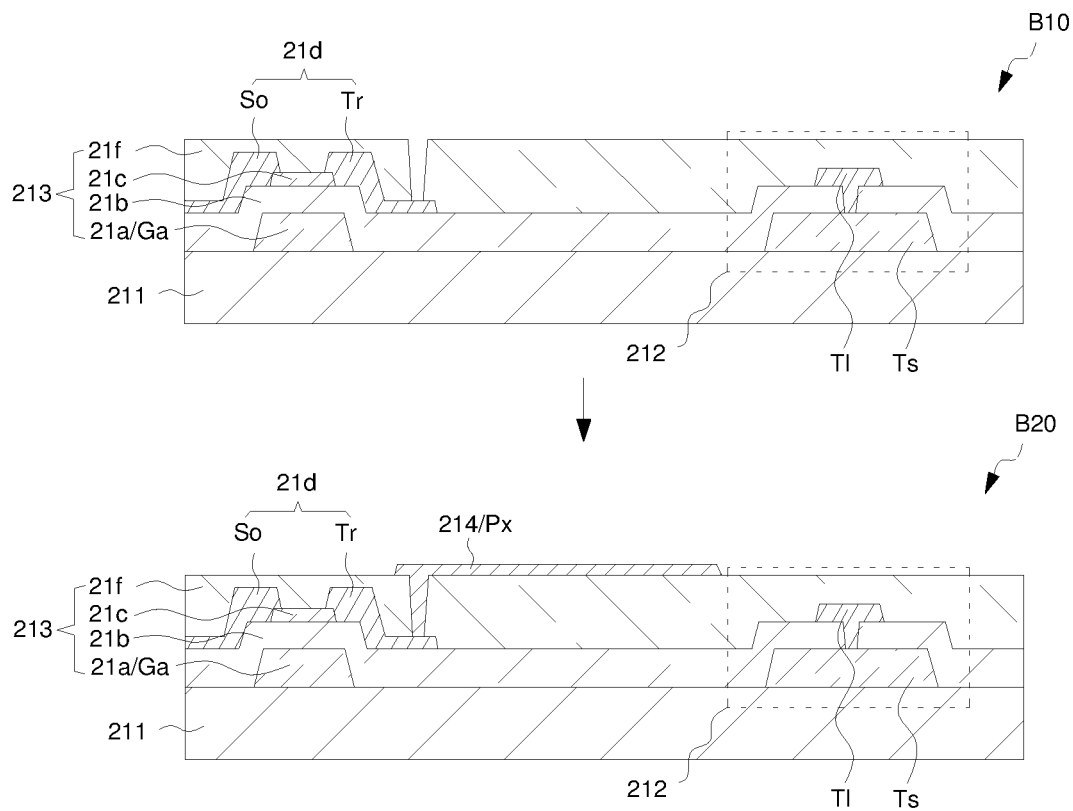
FIG. 8 is a schematic diagram of a preparation process of a first substrate of the touch display panel according to the second embodiment of the present application.

Referring to FIG. 8, a preparation process of the first substrate 21 of the touch display panel 200 according to the second embodiment is as follows:

In step B10, a first metal layer 21a, a first insulating layer 21b, an active layer 21c, a second metal layer 21d, and a second insulating layer 21f are sequentially formed on a first underlayer 211. The process then proceeds to step B20.

The first metal layer 21a includes a gate electrode Ga and a touch electrode Ts. The second metal layer 21d includes a source electrode So, a drain electrode Tr, and a touch trace T1. The source electrode So and the drain electrode Tr are connected to the active layer 21c.

The gate electrode Ga and the touch electrode Ts are prepared by a same photomask. The source electrode So, the drain electrode Tr, and the touch trace T1 are prepared by a same photomask.

Wherein the gate electrode Ga, the source electrode So, the drain electrode Tr, and the active layer 21c are used to form a thin film transistor. The touch electrode Ts and the touch trace T1 are used to form a touch structure layer 212.

Optionally, materials of the first insulating layer 21b and the second insulating layer 21f may include at least one of silicon nitride, silicon oxide, and organic photoresist.

Optionally, materials of the first metal layer 21a and the second metal layer 21d may be metals or metal alloys, such as gold, silver, tungsten, copper, molybdenum, iron, aluminum, aluminum-silicon, aluminum-titanium, and the like.

In step B20, a pixel electrode layer 214 is formed on a thin film transistor layer 213. The pixel electrode layer 214 includes a pixel electrode Px. The pixel electrode Px is connected to the drain electrode Tr.

This completes the preparation process of the first substrate 21 of the touch display panel 200 according to the second embodiment of the present application.

The touch display panel provided in the embodiments of the present application is described in detail above. The principles and embodiments of the present application are described in detail herein. The description of the embodiments is merely intended to help understand the method and core ideas of the present application. At the same time, a person skilled in the art may make changes in the specific embodiments and application scope according to the idea of the present application. In conclusion, the content of the specification should not be construed as a limitation to the present application.

What is claimed is:

1. A touch display panel, comprising:
   a first substrate located on a light-exiting side of the touch display panel;
   a second substrate disposed opposite to the first substrate, and located on a light-entering side of the touch display panel; and
   a liquid crystal disposed between the first substrate and the second substrate;
   wherein the first substrate comprises a first underlayer, a touch structure layer, a thin film transistor layer, and a pixel electrode layer; the touch structure layer and the thin film transistor layer are disposed on a side of the first underlayer close to the liquid crystal, the pixel electrode layer is disposed on a side of the thin film transistor layer and the touch structure layer close to the liquid crystal;
   the touch structure layer comprises a touch electrode and a touch trace; the touch trace is disposed in a different layer from the touch electrode, the touch trace is connected to the touch electrode, the touch electrode is multiplexed as a common electrode; and
   the touch display panel further comprises a display touch chip connected to the touch trace;
   wherein the touch structure layer is prepared in the thin film transistor layer;
   wherein the thin film transistor layer comprises a first metal layer, a first insulating layer, an active layer, a second metal layer, and a second insulating layer; the first insulating layer is disposed on the first metal layer, the active layer is disposed on the first insulating layer, the second metal layer is disposed on the first insulating layer, the second insulating layer covers the active layer and the second metal layer; the pixel electrode layer is disposed on the second insulating layer; and
   the first metal layer comprises a gate electrode and a touch electrode, the second metal layer comprises a source electrode, a drain electrode, and a touch trace; the source electrode and the drain electrode are connected to the active layer, and the touch trace is disposed on the first insulating layer and spaced from the active layer.

2. The touch display panel according to claim 1, wherein the thin film transistor layer is disposed on a side of the touch structure layer away from the first underlayer.

3. The touch display panel according to claim 2, wherein the pixel electrode layer comprises a pixel electrode, and the touch electrode and the pixel electrode are partially overlapped.

4. The touch display panel according to claim 3, wherein an orthographic projection of a portion of the touch electrode on a plane where the first underlayer is located is complementary to an orthographic projection of a portion of the pixel electrode on the plane where the first underlayer is located.

5. The touch display panel according to claim 4, wherein the touch electrode comprises a first frame, a first trunk electrode, and a first branch electrode; the first trunk electrode is connected in the first frame, an end of the first branch electrode is connected to the first trunk electrode, another end of the first branch electrode is connected to the first frame; a plurality of the first branch electrodes are arranged at intervals;
   the pixel electrode comprises a second frame, a second trunk electrode, and a second branch electrode; the second trunk electrode is connected in the second frame, an end of the second branch electrode is connected to the second trunk electrode, another end of the second branch electrode is connected to the second frame; and a plurality of the second branch electrodes are arranged at intervals; and
   wherein the first frame and the second frame are disposed overlappingly, the first trunk electrode and the second trunk electrode are disposed overlappingly; and an orthographic projection of the first branch electrode on the plane where the first underlayer is located and an orthographic projection of the second branch electrode on the plane where the first underlayer is located are arranged alternately.

6. The touch display panel according to claim 5, wherein the touch structure layer further comprises a first insulating layer and a second insulating layer; the touch electrode, the first insulating layer, the touch trace, and the second insulating layer are sequentially disposed on the first underlayer;
   the thin film transistor layer comprises a first metal layer, a third insulating layer, an active layer, a second metal layer, and a fourth insulating layer, wherein the third insulating layer is disposed on the first metal layer, the active layer is disposed on the third insulating layer, the second metal layer is disposed on the third insulating layer, the fourth insulating layer covers the active layer and the second metal layer, and the pixel electrode layer is disposed on the fourth insulating layer; and
   the first metal layer comprises a gate electrode, the second metal layer comprises a source electrode and a drain electrode, wherein the source electrode and the drain electrode are connected to the active layer, and the pixel electrode is connected to the drain electrode.

7. A touch display panel, comprising:
   a first substrate located on a light-exiting side of the touch display panel;
   a second substrate disposed opposite to the first substrate, and located on a light-entering side of the touch display panel; and
   a liquid crystal disposed between the first substrate and the second substrate;
   wherein the first substrate comprises a first underlayer, a touch structure layer, a thin film transistor layer, and a pixel electrode layer; the touch structure layer and the thin film transistor layer are disposed on a side of the first underlayer close to the liquid crystal, and the pixel electrode layer is disposed on a side of the thin film transistor layer and the touch structure layer close to the liquid crystal;

wherein the touch structure layer comprises a touch electrode and a touch trace; the touch trace is disposed in a different layer from the touch electrode, the touch trace is connected to the touch electrode, and the touch electrode is multiplexed as a common electrode;

wherein the touch structure layer is prepared in the thin film transistor layer;

wherein the thin film transistor layer comprises a first metal layer, a first insulating layer, an active layer, a second metal layer, and a second insulating layer; the first insulating layer is disposed on the first metal layer, the active layer is disposed on the first insulating layer, the second metal layer is disposed on the first insulating layer, the second insulating layer covers the active layer and the second metal layer; the pixel electrode layer is disposed on the second insulating layer; and the first metal layer comprises a gate electrode and a touch electrode, the second metal layer comprises a source electrode, a drain electrode, and a touch trace; the source electrode and the drain electrode are connected to the active layer, and the touch trace is disposed on the first insulating layer and spaced from the active layer.

8. The touch display panel according to claim 7, wherein the thin film transistor layer is disposed on a side of the touch structure layer away from the first underlayer.

9. The touch display panel according to claim 8, wherein the pixel electrode layer comprises a pixel electrode, and the touch electrode and the pixel electrode are partially overlapped.

10. The touch display panel according to claim 9, wherein an orthographic projection of a portion of the touch electrode on a plane where the first underlayer is located is complementary to an orthographic projection of a portion of the pixel electrode on the plane where the first underlayer is located.

11. The touch display panel according to claim 10, wherein the touch electrode comprises a first frame, a first trunk electrode, and a first branch electrode, the first trunk electrode is connected in the first frame, an end of the first branch electrode is connected to the first trunk electrode, another end of the first branch electrode is connected to the first frame, a plurality of the first branch electrodes are arranged at intervals;

the pixel electrode comprises a second frame, a second trunk electrode, and a second branch electrode, the second trunk electrode is connected in the second frame, an end of the second branch electrode is connected to the second trunk electrode, another end of the second branch electrode is connected to the second frame; and a plurality of the second branch electrodes are arranged at intervals; and wherein the first frame and the second frame are disposed overlappingly, the first trunk electrode and the second trunk electrode are disposed overlappingly, and an orthographic projection of the first branch electrode on the plane where the first underlayer is located and an orthographic projection of the second branch electrode on the plane where the first underlayer is located are arranged alternately.

12. The touch display panel according to claim 11, wherein the touch structure layer further comprises a first insulating layer and a second insulating layer; the touch electrode, the first insulating layer, the touch trace, and the second insulating layer are sequentially disposed on the first underlayer;

the thin film transistor layer comprises a first metal layer, a third insulating layer, an active layer, a second metal layer, and a fourth insulating layer, wherein the third insulating layer is disposed on the first metal layer, the active layer is disposed on the third insulating layer, the second metal layer is disposed on the third insulating layer, the fourth insulating layer covers the active layer and the second metal layer, and the pixel electrode layer is disposed on the fourth insulating layer; and the first metal layer comprises a gate electrode, the second metal layer comprises a source electrode and a drain electrode, wherein the source electrode and the drain electrode are connected to the active layer, and the pixel electrode is connected to the drain electrode.

13. The touch display panel according to claim 12, wherein a material of the pixel electrode is same as a material of the touch electrode.

14. The touch display panel according to claim 7, wherein the second substrate comprises a second underlayer and a common electrode layer disposed on a side of the second underlayer close to the liquid crystal; and the touch display panel further comprises a color film layer prepared in the first substrate or the second substrate.

15. The touch display panel according to claim 7, wherein the touch display panel the further comprises a display touch chip connected to the touch trace.

16. A touch display panel, comprising:
a first substrate located on a light-exiting side of the touch display panel;
a second substrate disposed opposite to the first substrate, and located on a light-entering side of the touch display panel; and
a liquid crystal disposed between the first substrate and the second substrate;
wherein the first substrate comprises a first underlayer, a touch structure layer, a thin film transistor layer, and a pixel electrode layer; the touch structure layer and the thin film transistor layer are disposed on a side of the first underlayer close to the liquid crystal, the pixel electrode layer is disposed on a side of the thin film transistor layer and the touch structure layer close to the liquid crystal;
the touch structure layer comprises a touch electrode and a touch trace; the touch trace is disposed in a different layer from the touch electrode, the touch trace is connected to the touch electrode, the touch electrode is multiplexed as a common electrode; and
the touch display panel further comprises a display touch chip connected to the touch trace;
wherein the thin film transistor layer is disposed on a side of the touch structure layer away from the first underlayer;
wherein the pixel electrode layer comprises a pixel electrode, and the touch electrode and the pixel electrode are partially overlapped;
wherein an orthographic projection of a portion of the touch electrode on a plane where the first underlayer is located is complementary to an orthographic projection of a portion of the pixel electrode on the plane where the first underlayer is located;
wherein the touch electrode comprises a first frame, a first trunk electrode, and a first branch electrode; the first trunk electrode is connected in the first frame, an end of the first branch electrode is connected to the first trunk electrode, another end of the first branch electrode is connected to the first frame; a plurality of the first branch electrodes are arranged at intervals;

the pixel electrode comprises a second frame, a second trunk electrode, and a second branch electrode; the second trunk electrode is connected in the second frame, an end of the second branch electrode is connected to the second trunk electrode, another end of the second branch electrode is connected to the second frame; and a plurality of the second branch electrodes are arranged at intervals; and wherein the first frame and the second frame are disposed overlappingly, the first trunk electrode and the second trunk electrode are disposed overlappingly; and an orthographic projection of the first branch electrode on the plane where the first underlayer is located and an orthographic projection of the second branch electrode on the plane where the first underlayer is located are arranged alternately.

17. The touch display panel according to claim 16, wherein the touch structure layer is prepared in the thin film transistor layer.

18. The touch display panel according to claim 16, wherein the thin film transistor layer is disposed on a side of the touch structure layer away from the first underlayer.

19. The touch display panel according to claim 17, wherein the thin film transistor layer comprises a first metal layer, a first insulating layer, an active layer, a second metal layer, and a second insulating layer; the first insulating layer is disposed on the first metal layer, the active layer is disposed on the first insulating layer, the second metal layer is disposed on the first insulating layer, the second insulating layer covers the active layer and the second metal layer; the pixel electrode layer is disposed on the second insulating layer; and the first metal layer comprises a gate electrode and a touch electrode, the second metal layer comprises a source electrode, a drain electrode, and a touch trace; the source electrode and the drain electrode are connected to the active layer, and the touch trace is disposed on the first insulating layer and spaced from the active layer.

20. The touch display panel according to claim 18, wherein the pixel electrode layer comprises a pixel electrode, and the touch electrode and the pixel electrode are partially overlapped.

* * * * *